(12) United States Patent
Cozby et al.

(10) Patent No.: US 10,410,134 B1
(45) Date of Patent: Sep. 10, 2019

(54) VISUALIZATION OF A PERFORMANCE METRIC AGAINST A PERFORMANCE THRESHOLD

(71) Applicant: The United States of America, as represented by the Secretary of the Army, Washington, DC (US)

(72) Inventors: Richard Cozby, Bel Air, MD (US); Dennis Bushmitch, Somerset, NJ (US); Michael Badger, Ocean Grove, MD (US)

(73) Assignee: The Government of the United States, as represented by the Secretary of the Army, Washington, DC (US)

(*) Notice: Subject to any disclaimer, the term of this patent is extended or adjusted under 35 U.S.C. 154(b) by 1698 days.

(21) Appl. No.: 13/803,812

(22) Filed: Mar. 14, 2013

(51) Int. Cl.
*G06N 20/00* (2019.01)
*G06F 3/0484* (2013.01)

(52) U.S. Cl.
CPC .......... *G06N 20/00* (2019.01); *G06F 3/0484* (2013.01)

(58) Field of Classification Search
None
See application file for complete search history.

(56) References Cited

U.S. PATENT DOCUMENTS

| | | |
|---|---|---|
| 7,877,341 B2 | 1/2011 | Wang |
| 8,200,591 B2 | 6/2012 | Govindaraj et al. |
| 2007/0277111 A1* | 11/2007 | Bennett .............. G06F 3/04812 715/763 |
| 2009/0030869 A1 | 1/2009 | Aharoni et al. |
| 2009/0271721 A1 | 10/2009 | Weber et al. |

OTHER PUBLICATIONS

Best, Daniel M., et al. "Real-time visualization of network behaviors for situational awareness." Proceedings of the seventh international symposium on visualization for cyber security. ACM, 2010.*
Parashar, Manish, and Jianzhong Mo. "Real time dynamics monitoring system (RTDMS): phasor applications for the control room." System Sciences, 2009. HICSS'09. 42nd Hawaii International Conference on. IEEE, 2009.*
Badger, et al.; Automated Performance Assessment Framework Innovation (APAFI) Project; Nov. 2012.
(Continued)

*Primary Examiner* — Bijan Mapar
(74) *Attorney, Agent, or Firm* — Ronald Krosky; Azza Jayaprakash

(57) ABSTRACT

Various embodiments associated with an interface that displays a visualization are described. In a combat or other environment, a great deal of information can be made available. In addition, this information can be compared against a metric of performance. This metric of performance could be qualitative or quantitative. In a complex environment, a relatively large amount of information can be gathered and it can be beneficial to produce an interface that enables a user to quickly understand the information with specific emphasis on how an entity related to the information is performing against the metric. The interface can include various features, such as time controls that allows for playback of previous information, measures of performance, and a structured tree view that illustrates hierarchical relationships of elements.

20 Claims, 14 Drawing Sheets

(56) References Cited

OTHER PUBLICATIONS

Badger, et al.; Laboratory-Based End-To-End Network System of Systems Integration, Design and Risk Reduction: Critical Activity for System of Systems Integration Directorate and the Army; Nov. 2012.

Cox, et al.; Communication Effects Server Configuration Capability (CC) and Analysis Framework (AF) for Brigade Combat Team Modernization (BCTM) Simulations; Nov. 2010.

* cited by examiner

VISUALIZATION OF A PERFORMANCE METRIC AGAINST A PERFORMANCE THRESHOLD

GOVERNMENT INTEREST

The innovation described herein may be manufactured, used, imported, sold, and licensed by or for the Government of the United States of America without the payment of any royalty thereon or therefore.

BACKGROUND

In a combat environment, a wide range of information can be made available. For example, a combat force can include an armor group, an infantry group, and an artillery group. Information can be produced from the armor group about how individual tanks are performing and how the tanks as a group are performing. Similar information can be produced for the infantry group and artillery group. Furthermore, information can be gathered on how the different groups interact with one another such as how infantry soldiers perform after the artillery group completes a task.

SUMMARY

A method is disclosed comprising accessing, by way of a visualization apparatus, a performance metric of a system comprising a distributed database. The method also comprises accessing, by way of the visualization apparatus, a performance threshold for the performance metric, where the performance metric is derived from a first verification and evaluation subsystem that operates in parallel to a second verification and evaluation subsystem. The method further comprises causing, by way of the visualization apparatus, a first visualization to display on an interface, where the first visualization illustrates the performance metric against the performance threshold and where the performance threshold is adjustable by way of the interface while the visualization is displayed. The method additionally comprises causing, by way of the visualization apparatus, the first visualization to be replaced with a second visualization, where the first visualization is of a first level of the system, where the second visualization is of a second level of the system, where the first level and the second level are time-synchronized with one another, and where the first level and the second level share a hierarchical relationship.

A system is disclosed comprising a trainer component, a deployment component, and a processor. The trainer component is configured to train an adaptive learning system through use a correlation of technical performance data against operational performance data, where the adaptive learning system is configured to predict operational performance of a system from a technical perspective and from a tiered data and metric perspective. The deployment component is configured to cause the adaptive learning system to be deployed after the adaptive learning system is trained, where the adaptive learning system is configured to determine an effectiveness of an organization once deployed. The processor is configured to execute at least one instruction associated with the trainer component or the deployment component.

A system comprising an adaptive learning system is described. The adaptive learning system is configured to receive a set of technical performance data from an organization. The adaptive learning system is also configured to make a prediction of the organization based, at least in part, on the technical performance data, where the prediction is made through use of a trained intelligence, where the prediction is accessed by a visualization and analysis subsystem, and where the visualization and analysis subsystem causes the prediction to be represented in a visualization that is presented on an interface.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
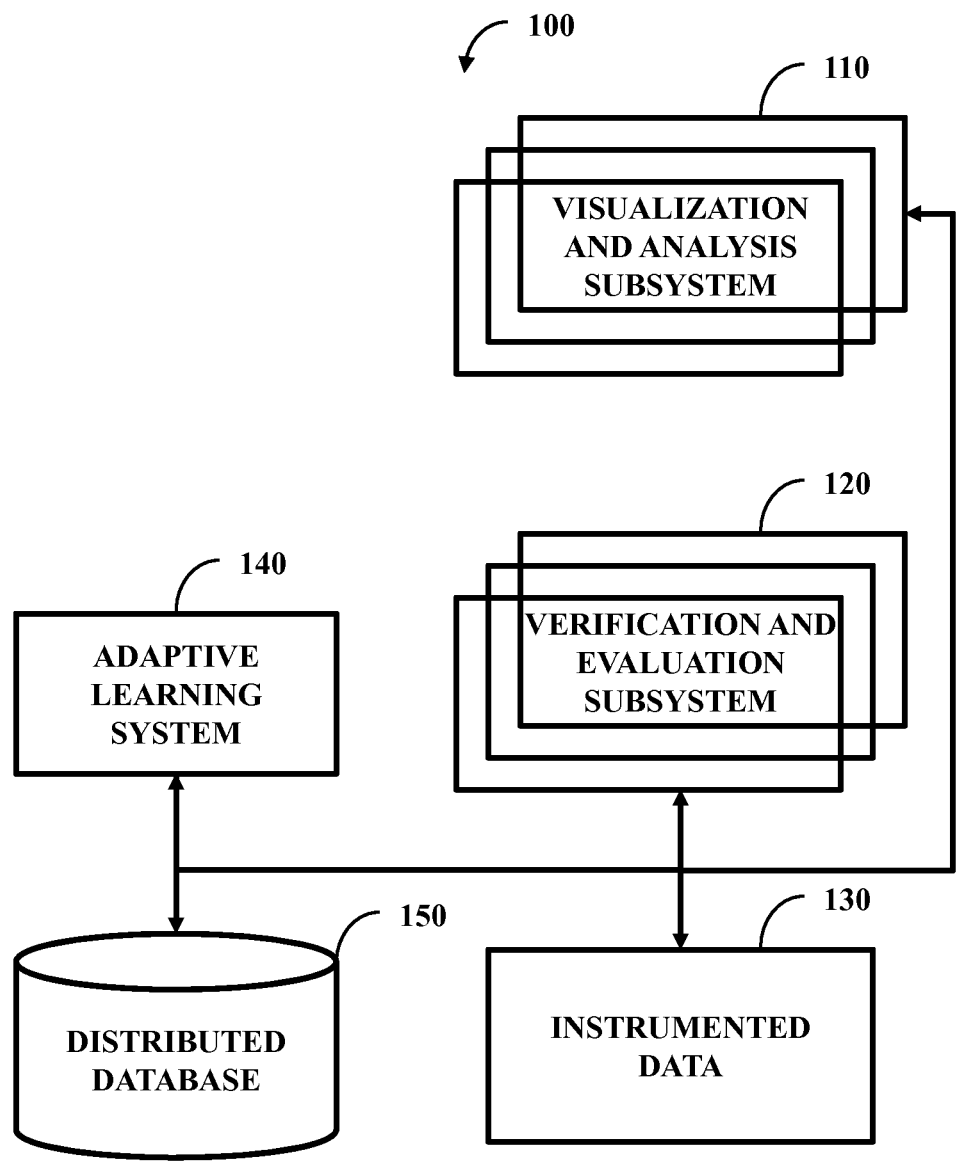
FIG. 1 illustrates one embodiment of a system comprising a visualization and analysis subsystem, a verification and evaluation subsystem, instrumented data, an adaptive learning system, and a distributed database.

Aspects related to correlation of technical performance data against operational performance data are described. In a combat or other environment, a great deal of information can be made available. In addition, this information can be compared against a metric of performance (e.g., one or more performance metric). This metric of performance could be qualitative or quantitative. In a complex environment, a relatively large amount of information can be gathered and it can be beneficial to produce an interface that enables a user to quickly understand the information with specific emphasis on how an entity related to the information is performing against the metric.

The interface can include a graphic that shows how information, and thus how an underlying aspect, measures against a performance metric. A visual indicator can be provided on how the information measures against the performance metric. In one example, if the metric is being met with high success, then the visual indicator can be green. If the metric is being met with passing, yet not high, success, then the visual indicator can be yellow. If the metric is not being met, then the visual indicator can be red. The visual indicator can be a real-time representation of performance of an aspect and the performance metric can be modifiable.

Various features disclosed herein can be practiced and visualized. One feature can be making a correlation of operation and technical and requirements decomposition with subsequent proactive prediction of operational from technical data. Another feature can be distributed computation of various layer measures of performance. Yet another feature can be proactive determination of requirements satisfaction (e.g., operational or technical at various layers of a system or force). A further feature is control of analytical and experimentation scope.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a visualization and analysis subsystem (VAS) 110 (e.g., one or more VAS), a verification and evaluation subsystem (VES) 120 (e.g., one or more VES), instrumented data 130, an adaptive learning system 140, and a distributed database 150. Various data that pertains to operation of a complex system can be collected and retained as the instrumented data 130 in the distributed database 150. Other data can be retained in the distributed database 150, such as results of a survey (e.g., qualitative survey, quantitative survey, etc.) on operational effectiveness of a system or a sub-element of the system. The VES 120 can derive atomic (e.g., lowest level) and compound metrics (e.g., above atomic) from the instrumented data 130 (e.g., raw packet data and metadata) or other data (e.g., test result data, experimentation data, predictive data, observation data, etc.) in real-time, near real-time, etc. The compound metrics can be stored in the distributed database 150 for consumption by the VAS 110. Other information can be retained in the distributed database 150, such as data produced by at least one component disclosed herein or elsewhere (e.g., results from modeling and simulation). The VES 120 can comprise of various components such as a platform metric evaluator, a sequential thread evaluator, a streaming media evaluator, and global metric evaluator and these evaluators can produce different measures of performance (MOP) and implement, at least in part, as software. The platform metric evaluator can provide per entity, per service atomic metrics at a configurable periodic time interval. The sequential thread evaluator can assess status and performance, against service requirements, of mission thread sequences (e.g., Call for Fire, between multiple entities). The sequential thread evaluator can also track and store progress of individual threads in real-time and report a completed state for individual threads. The streaming media evaluator can assess status and performance, against service requirements, of threads consisting of transmission and reception of streaming data (e.g., Full Motion Video). The system 100 can apply shallow and deep data packet inspection methods and can generate packet metadata (e.g., that is part of the instrumented data 130). The packet metadata can be used by the VES 120 to correlate packets belonging to specific services and threads within a service. With this correlation, the VES 120 can synthesize raw data into atomic and compound metrics that are used to measure operational effectiveness. In one embodiment, the VES 120 can verify compliance with requirements and thresholds as well as generate metadata and additional MOPs in the distributed database 150 accordingly. The VES 120 can also aid the analytical and scope selection function of VAS 110 (e.g., with multiple editions of the VAS 110 that are distributed). Multiple analysts can have different instances of VASs with different scope selection criteria at their own locations. In one embodiment, the VAS 110 functions as a visualization apparatus.

The VAS can proactively (e.g., automatically) produce visual identification of the threshold vs. objective requirement violations and visualization of the instrumented data 130 (e.g., in addition to other data). The VAS can comprise a client subsystem and a server subsystem. The server subsystem can interact with multiple client subsystems such that individual client subsystems are kept independent. In addition, a plurality of VASs 110 can facilitate analysis scalability. The VAS 110 and/or the VES 120 can build compound metrics from data about the system (e.g., an element of the system). In one embodiment, the VES 120 can verify requirements on top of other functions while the VAS 110 provides visualization aspects and provides functionality for experiment control selection as well as scope selection. In one embodiment, the VES 120 produces metadata pertaining to MOP requirement satisfaction (e.g., at a global requirement level). A requirement changed by a user can be assessed and rendered by the VAS 110. The VAS 110 can render data and thus create a visualization disclosed herein as well as render requirement satisfaction metadata produced by the VES 120 (e.g., satisfaction metadata is disclosed as part of the visualization).

The adaptive learning system 140 can be trained using technical performance data that is part of the instrumented data, operational performance data (e.g., instrumented data, surveyed data, etc.), or other data. This training can occur while the instrumented data is correlated, by a component, with operational performance data and/or overall operational capability assessment. The adaptive learning system 140 can include human-in-loop upon its training to determine operational effectiveness scoring of network components (e.g., component of a network from which the instrumented data 130 is obtained). When deployed, the adaptive learning system 140 can proactively determine operational performance given technical performance data (e.g., that is part of the instrumented data) from the network's instrumentation. The adaptive learning system 140 (e.g., once initially training and deployed) can predict operational performance from technical performance. The adaptive learning system 140 can provide results from analyses that are stored in the distributed database 150 and the distributed database 150 makes these results available to the VAS 110.

In one embodiment, the distributed database 150 of FIG. 1 can be fed by instrumentation and lower level atomic MOPs in real time or near real time. Also, the distributed database 150 of FIG. 1 can obtain that data in off-line mode and VAS 110 and/or VES 120 can build higher level MOPs. Operational effectiveness and/or user surveys can be entered into the distributed database 150 of FIG. 1. The distributed database 150 can enable a data communication bus between elements of the system 100. In one embodiment, the VAS 110 and VES 120 can be similar except the VES 120 can proactively verify requirements satisfaction and generate metadata to that extent while the VAS 110 visualizes and provides scope selection/operator control. The VAS 110 and VES 120 can produce higher level MOPs from lower level MOPs. The adaptive learning system 140 can also generate MOPs (e.g., to be stored in the distributed database 150).

Figure 2:
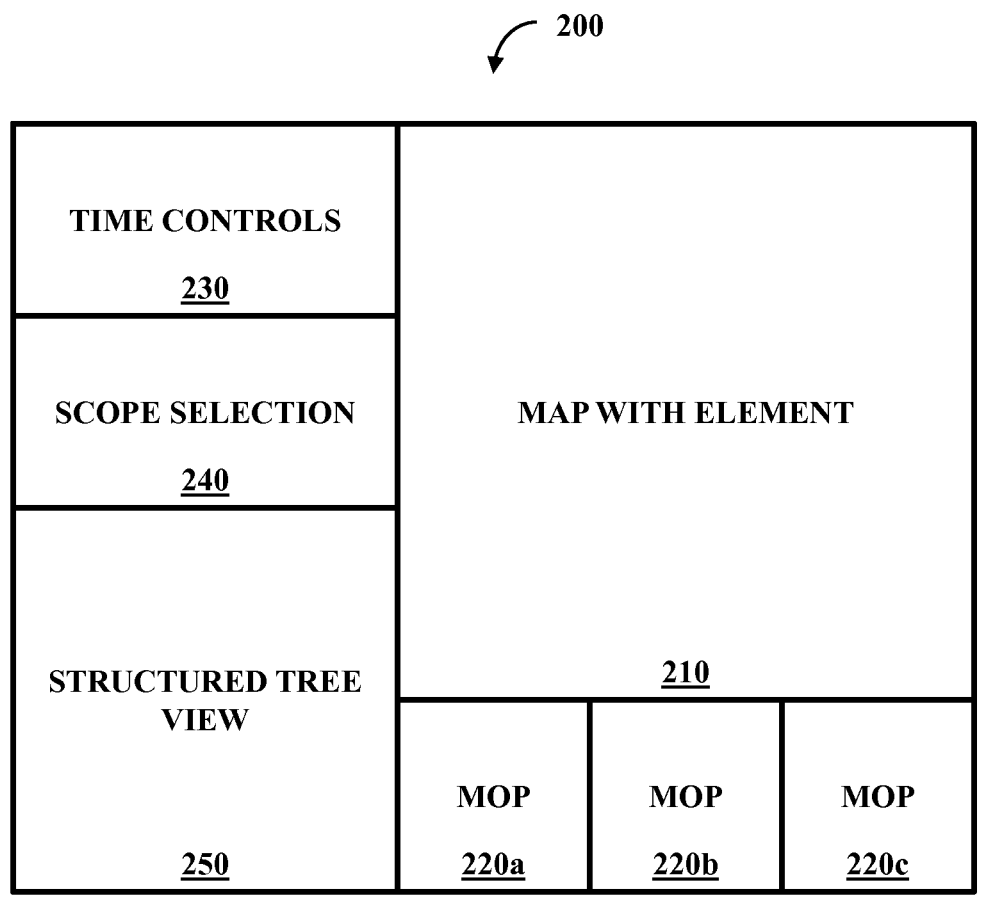
FIG. 2 illustrates one embodiment of an interface that can be produced from practicing at least one aspect disclosed herein.

FIG. 2 illustrates one embodiment of an interface 200 that can be produced from practicing at least one aspect disclosed herein. In a combat environment, different elements can have different performance metrics. In one example, a force can have an armor section of three tanks operated by four soldiers each and an artillery element of two cannons operated by three soldiers each. This example will be used throughout the detailed description in discussion of various aspects and will be referred to as the previous example.

In one embodiment, a map with element 210 (e.g., map displaying one or more elements with a visual indicator of actual performance against threshold, such as a numeric value with a specific color) can be part of the interface that shows a physical location of the tanks and cannons (e.g., along a terrain map derived from an Internet-based map application) along with performance data. The visualization can include an icon that represents the tanks and cannons, as well as listing performance data. Further, the performance data that is listed and/or an icon (e.g., an icon of a tank) can be color-coded based on how the data measures against a performance metric (e.g., green for pass and red for fail).

Additionally, the interface 200 can include various visual representations of MOPs 220a-220c. The MOPs 220a-220c can vary in complexity, and include items such as graphs (e.g., transport network architecture graphs), threads, depictions (e.g., individual software service depictions), etc. A viewer of the interface 200 can select what is contained in the MOPs 220a-220c. In one example, the viewer can designate MOP 220a as ammunition usage rate of the two cannons combined, MOP 220b can be fuel rate consumption of the second tank, and MOP 220c can be firing accuracy of the overall force. While three MOPs 220a-220c are illustrated, it is to be appreciated by one of ordinary skill in the art that the interface 200 can comprise more or less than three MOPs. In one embodiment, the adaptive learning system 140 of FIG. 1 can predict MOP values and thus lower computational time for MOPs. In one example, MOPs from lower layers can be used to predict higher level MOPs. In one embodiment, different layers of MOPs can have custom views of displaying their information against requirements. Colors (e.g., green for pass) can be for satisfying both objective and threshold requirements, satisfying threshold or operational requirements, etc. Distributed scalable visualization of various MOPs and the levels of those MOPs satisfying their perspective requirements can be illustrated through the interface 200. Custom views for various MOPs and system views can also be produced through the interface 200 (e.g., Internet-based force/transport network laydown).

The interface 200 (e.g., graphical user interface) can also include time controls 230 such as pause, rewind, play, fast forward, and record. Data pertaining to the force can be recorded (e.g., proactively, after a viewer designates recording to occur, etc.) and the viewer can view the map with element 210 and/or at least one of the MOPs 220a-220c in real-time and/or from a previous time. The time controls 230 can include buttons (e.g., buttons can that can be pressed on a touch screen or through use of a computer mouse) and/or be graphically similar to those of a Digital Video Recorder (DVR).

The interface 200 can further include a scope selection 240. Different scopes can be selected that define other parts of the interface 200 and/or that limit viewing to a specific scope. For example, scope can be selected from choices of services (e.g., mission command applications and services), entities, threads, or transports. Other scope choices can be selected from among different transport networks, different ammunition systems, threads of exchanges (e.g., message exchanges, logical exchanges, etc.) between force entities, etc.

In addition, the interface 200 can include a structured tree view 250. The structured tree view 250 can be a hierarchical menu of the force. In the above example, the force can have a first level folder. Under the first level folder can be two second level folders—one for the armor section and one for the artillery section. Under the armor section folder, three third level folders can exist for individual tanks and under an individual tank folder, four fourth level folders can exist for individual soldiers. Likewise, under the artillery section folder, three third level folders can exist for individual cannons and under an individual cannon folder, three fourth level folders can exist for individual soldiers. The structured tree view 250 can be color coded based on performance. For example, if tank two out of three is not firing accurately against a metric, then the tank two folder, the four individual soldier folders under the tank two folder, the tank section folder, and the force folder can be colored red to indicate a requirement for the metric not being met while remaining folders are colored green. In one embodiment, the four individual soldier folders can be yellow indicating that they are not failing, but associated with a tank that is failing. Thus, the structured tree view 250 can indicate where a failure is occurring. Further, selecting a folder of the structured tree view 250 can cause default information to be displayed in the map with element 210 and/or cause specific information to be represented in the MOPs 220a-220c.

Different levels of the structured tree view 250 can present different information. In one example, at a first level different platforms can be selected, at a second level different mission command applications can be selected, and at a third level different software services or message types can be selected.

In addition, the interface 200 can be used to control parameterization of modeling and simulation, scenarios on top of scope selection, and others. In one example, the interface 200 can include a keyboard (e.g., an on-screen keyboard) or be connected to a keyboard (e.g., and mouse). Through use of the keyboard, a view of the interface can customize parameters, use the time controls 230, etc.

While aspects disclosed herein discuss a single force of two sections and five elements, it is to be appreciated by one of ordinary skill in the art that aspects disclosed herein can be practiced with regard to more simple or more complex arrangements as well as smaller or larger arrangements (e.g., division-sized forces and systems of systems representing those forces). While aspects described herein are discussed as relating to a combat environment, it is to be appreciated by one of ordinary skill in the art that aspects disclosed herein can be practiced in non-combat environments. For example, aspects disclosed herein can be used to manage business performance (e.g., how individuals are performing at their computers, how office sites are performing, etc.), observe sports performance (e.g., for an auto racing team fielding several cars in a race, how individual cars are performing, how parts of the car are performing, etc.), and others.

Figure 3:
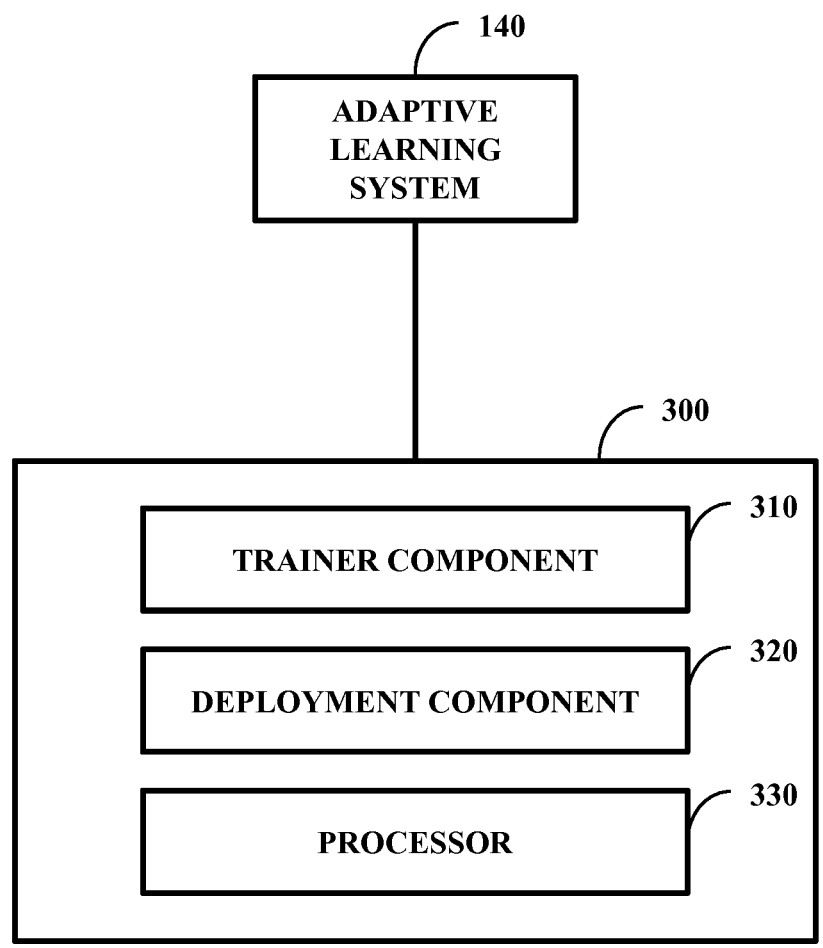
FIG. 3 illustrates one embodiment of a system comprising a trainer component, a deployment component, and a processor.

FIG. 3 illustrates one embodiment of a system 300 comprising a trainer component 310, a deployment component 320, and a processor 330. The trainer component 310 is configured to train the adaptive learning system 140 (e.g., the adaptive learning system 140 can function as its own system outside of the system 300) through use a correlation of technical performance data (e.g., part of the instrumented data 130 of FIG. 1) against operational performance data, where the adaptive learning system is configured to predict operational performance of a system from a technical perspective and from a tiered data and metric perspective. The deployment component 320 is configured to cause the adaptive learning system 140 to be deployed after the adaptive learning system is successfully trained, where the adaptive learning system is configured to determine an effectiveness of an organization once deployed. The processor 330 is configured to execute at least one instruction associated with the trainer component 310 or the deployment component 320 (e.g., or at least one other component disclosed herein). In one embodiment, the trainer component 310, the deployment component 320, another component disclosed herein (e.g., the prediction component 410 of FIG. 4 discussed below), or a combination thereof can part of the adaptive learning system 140.

The system 300 can construct the adaptive learning system 140 and the trainer component 310 can present the adaptive learning system 140 with various input/output dependencies and correlated data sets. The adaptive learning system 140 can explore the correlations between these inputs and outputs against a training set of data (e.g., data obtained from the distributed database 150 of FIG. 1 and represents various levels of quantitative MOPs and qualitative survey data on operational effectiveness). Once the training is complete, the system 300 can put the adaptive learning system 140 into a different mode of operation, where the adaptive learning system 140 predicts outputs (e.g., operational results) from inputs (e.g., technical quantitative data). Predictions can be made with relatively few outliers.

In one embodiment, the adaptive learning system 140 is configured to receive a set of technical performance data (e.g., fire accuracy) from an organization (e.g., the force). The adaptive learning system 140 is also configured to make a prediction based, at least in part, on the technical performance data, where the prediction is made through use of trained intelligence (e.g., neural network trained by the trainer component 310), where the prediction is accessed by the VAS 110 of FIG. 1 (e.g., the VAS 110 of FIG. 1 along with the VES 120 of FIG. 1) and where the VAS 110 of FIG. 1 causes the prediction to be represented in a visualization that is presented on the interface 200 of FIG. 2. In one embodiment, the prediction can be a prediction of an operational result (e.g., mission success likelihood) of the organization and the visualization can include a visual representation (e.g., illustrate a percentage, present an icon that can be engaged to show a full report, etc.) of the operational result. In one embodiment, the prediction can be of a MOP of the organization, where the visualization includes a visual representation of the MOP.

Using the previous example, the trainer component 310 can train the adaptive learning system 140 such that when the tanks have a fire accuracy (e.g., technical performance data) of x %, the adaptive learning system 140 can predict that the mission has y % chance of eliminating a target (e.g., operational performance data) and target elimination can be operational performance. Thus, when the fire accuracy of the tanks (e.g., average among the tanks) is at x %, target elimination likelihood can be at y %. The adaptive learning system 140 can predict that if tanks have a fire accuracy of x % then target elimination is likely to occur at y % (e.g., technical perspective) and that if target elimination is likely to occur at y % from the tanks, then the force has a z % chance of mission completeness (e.g., a tiered data and metric perspective). In addition, the trainer component 310 can train the adaptive learning system 140 to make predictions on how the artillery performs in response to performance of the tanks. For example, accuracy of the tanks can be based on wind and this wind can influence accuracy of the artillery. Thus, a correlation can be drawn that low accuracy of the tanks in high wind could lead to low accuracy of artillery, and as such, a determination can be made that the artillery will have low accuracy and thus the force will have unacceptable accuracy. The deployment component 320 can deploy the adaptive learning system 140 with an operation. During the operation, fire accuracy can be monitored and based on a result from this monitoring, the adaptive learning system 140 can determine an effectiveness (e.g., target elimination likelihood based on fire rate accuracy) of the tanks and/or the force. While this is a relatively simple example, it is to be appreciated by one of ordinary skill in the art that more complex correlations can be made with more available data for examples disclosed herein.

In one embodiment, the adaptive learning system 140 is configured to determine operational performance of the organization through use of a scoring system (e.g., according to a set of defined compound-type MOPs). In one example, tank accuracy can be given a first weighted score and artillery accuracy can be given a second weighted score. The weighted scores can be combined and operational performance can be given a classification (e.g., exceptional, good, passing, failure) based on the combined score and/or individual scores (e.g., exceptional is given if the combined score meets an exceptional threshold and the tank and artillery scores meet individual exceptional thresholds).

In one embodiment, the technical performance data is proactively (e.g., automatically) determined (e.g., proactively determined by the VAS 110 of FIG. 1 and/or the VES 120 of FIG. 1) while the operational performance data is manually entered (e.g., obtained from a user survey, entered into a database through the interface 200 of FIG. 2, etc.). The technical performance data (e.g., mathematical performance of a cannon) can be data obtained by an instrument while operational performance data (e.g., that a cannon performed successfully) can be entered manually (e.g., by a technician). The trainer component 310 can draw a correlation between the technical performance data and the manually entered data.

In one embodiment, the trainer component 310 is configured to train the adaptive learning system 140 after deployment and/or the adaptive learning system 140 can be developed such that the adaptive learning system 140 is self-trainable. While the trainer component 310 can initially train the adaptive learning system 140, more information can become available that can be used to better train the adaptive learning system 140, information can change, etc. Therefore, after deployment the trainer component 310 can train (e.g., re-train, update, etc.) the adaptive learning system 140 and/or the adaptive learning system 140 can train itself.

In one embodiment, the adaptive learning system 140 can be self-trainable (e.g., be further trained) after deployment. In one example, the adaptive learning system 140 can be configured to observe an outcome associated with the prediction and make a comparison of the outcome against the prediction. The adaptive learning system 140 can also be configured to make a first determination on whether the trained intelligence should be modified based, at least in part, on a result of the comparison as well as make a second determination on a modification for the trained intelligence in response to the first determination being that the trained intelligence should be modified. The adaptive learning system 140 can modify the trained intelligence in accordance with the modification that is based, at least in part, on a result of the comparison and the trained intelligence.

In one embodiment, the organization is a first organization (e.g., tanks), where the adaptive learning system 140 is configured to determine an effectiveness of a second organization (e.g., artillery), once deployed concurrently with determination of the effectiveness of the first organization (e.g., the first organization and second organization are sub-organizations of a third organization (e.g., the force), the first organization and the second organization are separate and distinct organizations, etc.). In one example, the adaptive learning system 140 can determine effectiveness of the force as well as effectiveness of the tank, an individual tank, and parts of an individual tank (e.g., firing mechanism, driver, etc.). Thus, different levels of hierarchy can have their effectiveness determined. This effectiveness can be independent (e.g., the tanks as a group can be deemed effective while an individual tank is deemed ineffective) or dependent (e.g., the tanks as a group are not deemed effective unless the individual tanks of the group are individually deemed effective, the tanks as a group are not deemed effective unless the individual tanks of the group are individually deemed effective and the group is deemed effective, etc.).

Figure 4:
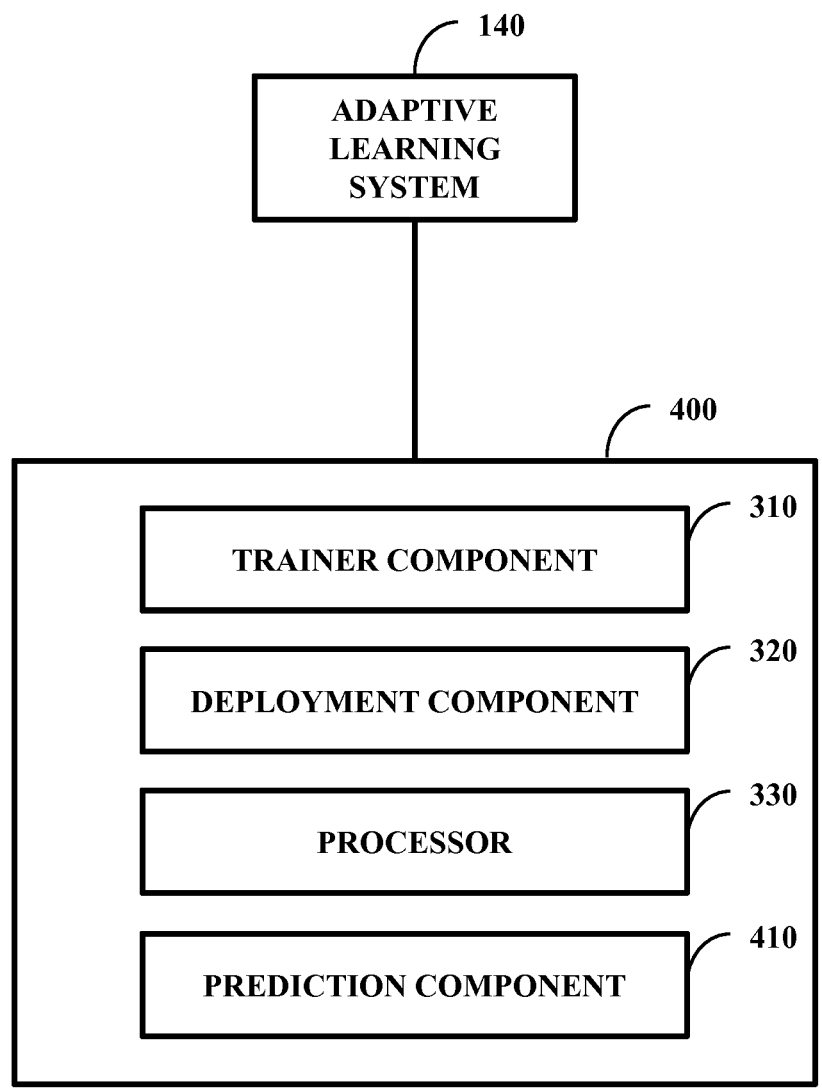
FIG. 4 illustrates one embodiment of a system comprising the trainer component, the deployment component, the processor, and a prediction component.

FIG. 4 illustrates one embodiment of a system 400 comprising the trainer component 310, the deployment component 320, the processor 330, and a prediction component 410. The prediction component 410 is configured to manage a prediction of a result of the organization to a scenario to be made. The prediction is made through use of the adaptive leaning system 140. Thus, the adaptive learning system 140 can be configured to make a prediction of a result of the organization to a scenario once deployed. The adaptive learning system 140 can make this prediction with or without the prediction component 410. The adaptive learning system 140 can determine operational effectiveness from a technical standpoint and determine values of MOPs (e.g., MOPs that are based on lower level MOPs).

In one embodiment, a request can be made on a likely result of an operation (e.g., user-generated request, computer-generated request, etc.). In one example, a commander can request how successful the force would be in elimination of a structure. The prediction component 410 can process this request and cause the adaptive learning system 140 to run a simulation on how the force would do based on weather conditions, training level of soldiers, etc. Running this simulation can cause prediction of a success of elimination of the structure (e.g., a percentage likelihood of success, a yes or no on if success is likely, a detailed prediction that details equipment damage, supply usage and other information, etc.). In one embodiment, a user or component enters the scenario and the prediction component 410 provides suggestions to the scenario that can improve success or change a certain factor, such as supply usage (e.g., taking a different path than requested, suggesting a best path when a path is not specified in the request, etc.). In one embodiment, the adaptive learning system 140 can predict elimination of a structure based, at least in part, on metric computation (e.g., lower level metric computation such as supply usage, health of an individual tank battle command system, or maneuverability against at least one battle scenario trigger). In one example, the adaptive learning system 140 can predict a higher level MOP from at least one lower level MOP (e.g., predict firing accuracy of the force from firing accuracy of a particular cannon, predict firing accuracy of the tanks from firing accuracy of the particular cannon, predict firing accuracy of the artillery group from firing accuracy of the particular cannon, predict tank ammunition usage from firing accuracy of the particular cannon, etc.). In one example, sensor feeds can be predicted from lower level atomic MOPs that indicate message completion of individual video data packets.

Figure 5:
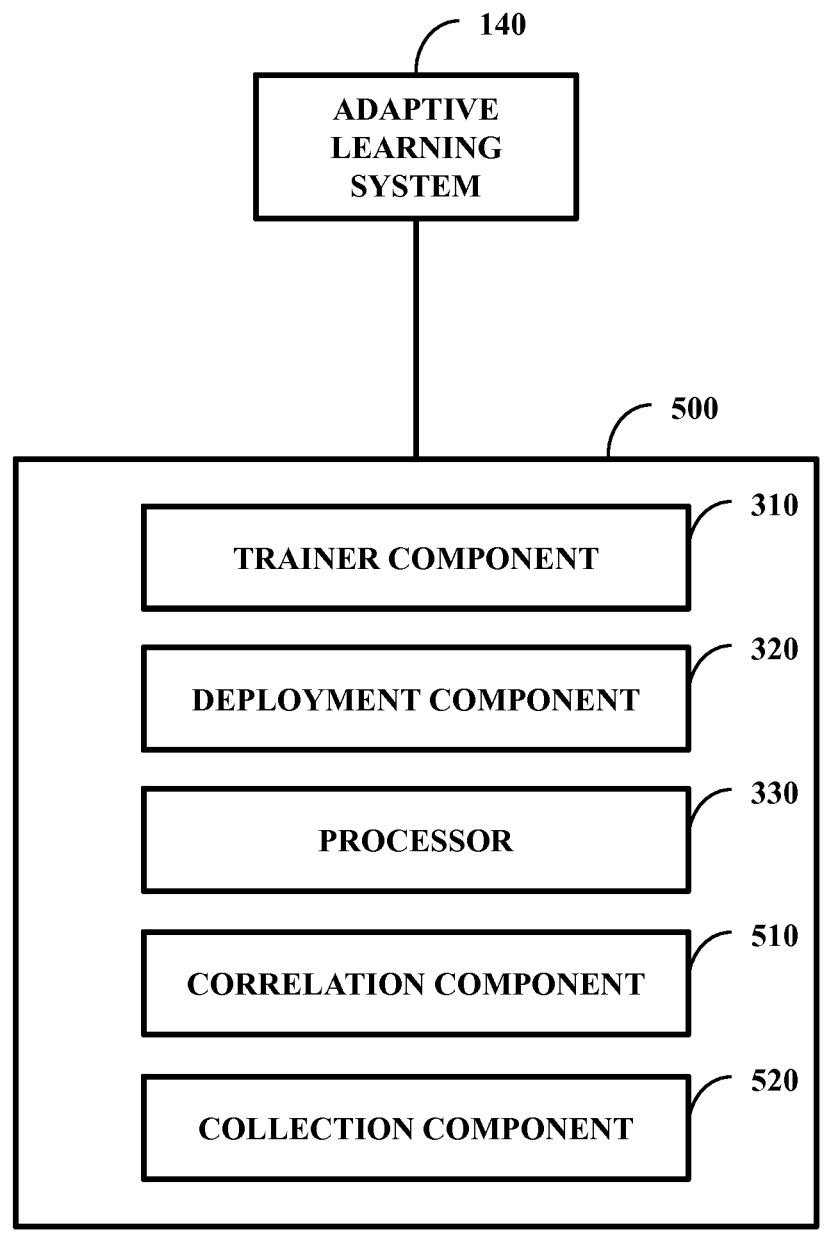
FIG. 5 illustrates one embodiment of a system comprising the trainer component, the deployment component, the processor, a correlation component, and a collection component.

FIG. 5 illustrates one embodiment of a system 500 comprising the trainer component 310, the deployment component 320, the processor 330, a correlation component 510, and a collection component 520. The correlation component 510 is configured to produce the correlation. The collection component 520 is configured to collect a manually entered information set. The trainer component 310 is configured to train the adaptive learning system 140 through use of the correlation and through use of the manually entered information set (e.g., manually entered operational performance survey information).

In addition to correlations being produced (e.g., observed, drawn, etc.) by the correlation component 510 to initially train the adaptive learning system 140, the adaptive learning system 140 can produce its own correlations (e.g., once deployed) and use those correlations to further train. These correlations can be based, at least in part, on the manually entered information set, an addition to the instrumented data 130, an observation made by the adaptive learning system 140, etc.

In one embodiment, the adaptive learning system 140 can be trained both through use of instrument-based data and user-entered data. In one example, the correlation can be when cannon accuracy is at a %, then cannon ammunition usage is at b %. In addition, a user can enter that when cannon accuracy is at a %, soldier fatigue increases by c %. With this information, trainer component 310 can train the adaptive learning system 140 in this example. The adaptive learning system 140 can be trainable using cannon accuracy, cannon ammunition usage, and at least one MOP or survey provided (e.g., computed) by a VAS 110 of FIG. 1 and/or VES 120 of FIG. 1 that is accessible by the adaptive learning system 140 by way of the distributed database 150 of FIG. 1.

Figure 6:
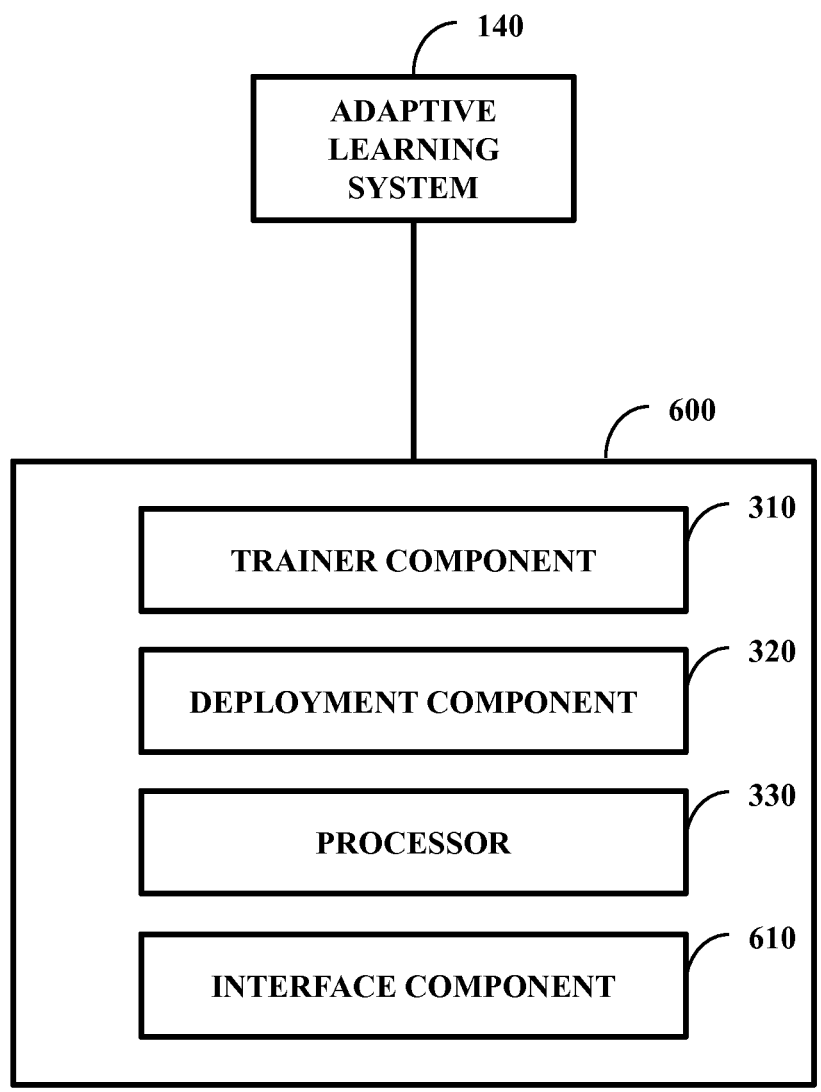
FIG. 6 illustrates one embodiment of a system comprising the trainer component, the deployment component, the processor, and an interface component.

FIG. 6 illustrates one embodiment of a system 600 comprising the trainer component 310, the deployment component 320, the processor 330, and an interface component 610. The interface component 610 is configured to cause a visualization (e.g., MOP 220a of FIG. 2) to display on an interface (e.g., the interface 200 of FIG. 2), where the visualization illustrates the effectiveness of the organization.

In one embodiment, the system 600 can comprise other components. In one example, the system 600 can comprise a capture component that captures a qualitative performance metric (e.g., one or more qualitative performance metric) of an organization and a quantitative performance metric (e.g., one or more quantitative performance metric) of the organization. The system 600 can also comprise a cross-correlation component that makes a cross-correlation between the qualitative performance metric and the quantitative performance metric, where the cross-correlation is disclosed. In one example, the system 600 further comprises a determination component that makes a determination of mission effectiveness based, at least in part, on the cross-correlation.

In one example, the qualitative performance metric can be accuracy from shells shot from the artillery of the previous example. The quantitative performance metric can be an amount of ammunition used per period of time. The cross-correlation can be that as more ammunition is used, accuracy is reduced. The determination of mission effectiveness can be that using n number of rounds per t amount of time will give g % of accuracy. When g % accuracy is reached, a goal is achieved. In one embodiment, the adaptive learning system 140 can use correlations to establish dependencies between at least one input (e.g., atomic MOP) and at least one output (e.g., operational MOP, higher level MOP, etc.) upon training.

Mission effectiveness can be how successfully a goal is achieved. The goal can be an objective goal or a subjective goal. The performance metric and/or the performance threshold can be objective (e.g., unit of measure for the force) or subjective (e.g., a commander's pleasure with performance).

Figure 7:
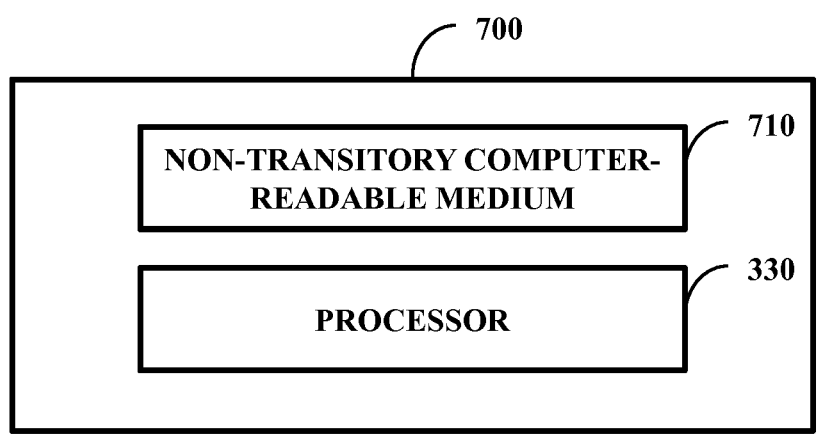
FIG. 7 illustrates one embodiment of a system comprising a non-transitory computer-readable medium and the processor.

FIG. 7 illustrates one embodiment of a system 700 comprising a non-transitory computer-readable medium 710 and the processor 330. In one embodiment, the non-transitory computer-readable medium 710 and the processor 330 are part of a visualization apparatus configured to perform at least one action disclosed herein. In one embodiment, the non-transitory computer-readable medium 710 is communicatively coupled to the processor 330, where the processor 330 stores executable instructions to facilitate operation of at least one component disclosed herein. In one embodiment, the distributed database 150 of FIG. 1 is the non-transitory computer-readable medium 710. In one embodiment, the non-transitory computer-readable medium 710 is configured to store computer-executable instructions that when executed by the processor 330 cause the processor 330 to perform at least part of a method disclosed herein. In one example method, there can be executing instructions from the non-transitory computer-readable medium 710.

Figure 8:
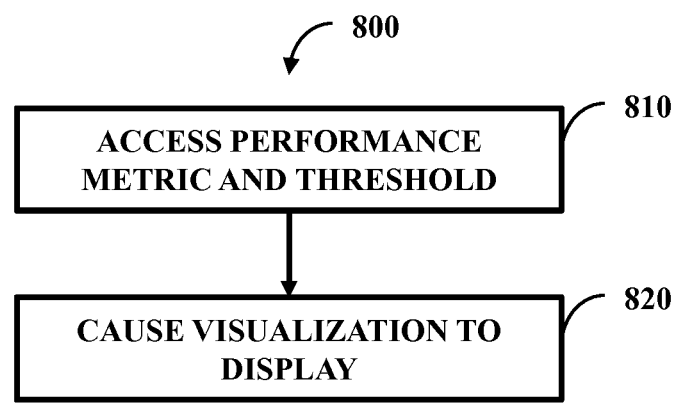
FIG. 8 illustrates one embodiment of a method comprising actions.

FIG. 8 illustrates one embodiment of a method 800 comprising actions 810-820. At 810 there is accessing a performance metric of a system (e.g., the force) comprising a distributed database (e.g., the distributed database 150 of FIG. 1) and accessing a performance threshold for the performance metric. The performance metric (e.g., performance data) is derived from a first verification and evaluation subsystem (e.g., an edition of the VES 120 of FIG. 1) that operates in parallel to a second verification and evaluation subsystem (e.g., an edition of the VES 120 of FIG. 1). At 820, there is causing a first visualization (e.g., map with element 210 of FIG. 2, MOP 220c of FIG. 2, etc.) to display on an interface (e.g., the interface 200 of FIG. 2), where the first visualization illustrates the performance metric against the performance threshold and where the performance threshold is adjustable (e.g., manually adjustable) by way of the interface while the visualization is displayed. At 820, there is also causing the first visualization to be replaced (e.g., completely replaced, replaced in part) with a second visualization, where the first visualization is of a first level of the system, where the second visualization is of a second level of the system, where the first level and the second level are time-synchronized with one another, and where the first level and the second level share a hierarchical relationship (e.g., the second level is below the first level).

In one example, the replacement can cause for data about a higher level of the organization (e.g., firing accuracy of the force) to be replaced with data about a lower level of the organization (e.g., firing accuracy of an individual tank) through engaging an icon on the interface in the tree stricture representing the lower level or vice versa (e.g., lower level to higher) as well as parallel and others (e.g., from a level on one branch to a higher, lower, or equal level on another branch). A map of the visualization can remain the same, but elements shown on the map can be changed (e.g., added, removed, modified, etc.) from the first visualization to the second visualization.

Returning to the previous example, a computer associated with the force can access a performance metric of the force (e.g., an amount of ammunition actually used by the force per hour while engaged in combat) and a performance threshold of the force (e.g., how much ammunition the force should be using while engaged in combat). The interface can display an MOP that shows the actual ammunition usage against a desired ammunition usage. In one example, the MOP can show that the actual ammunition usage is less than the desired ammunition of the force. A viewer of the interface can desire to find out what part of the force is not using the desired amount of ammunition and therefore send a request for an MOP of ammunition usage of the tanks to be presented. The MOP of the ammunition usage of the tanks can show that actual ammunition usage of the tanks is consistent with desired ammunition usage. Thus, the user can desire to view an MOP of the artillery. The MOP of the tanks can be replaced with an MOP of the artillery (e.g., direct replacement, return to MOP of the force then present the MOP of the artillery, etc.). The MOP of the artillery (e.g., a graph plotting usage per time period against desired usage) can show that ammunition artillery usage is not desired. The view can go further down into MOPs of individual cannons to isolate a problem and cause a command to be directed to change behavior (e.g., send an instruction to a personal electronic device of a soldier operating a cannon to change an ammunition usage rate).

In one embodiment, an individual VAS 110 of FIG. 1 is used by an analyst. Different instances of the VAS 110 of FIG. 1 are used by different analysts. Different analysts have different objectives and thus different scope of MOPs considerations. A VAS 110 of FIG. 1 can present different graphs and data rendering techniques to the analyst. The analyst can be provided the MOPs values in time and the analyst can have access to recording/rewind capability of looking into data (e.g., DVR type-controls). The VAS 110 of FIG. 1 can present hierarchical MOP views and use the colors of tree views and icons on the map to show the values against requirements satisfaction, as pre-computed by a VES 120 of FIG. 1 or determined by a VAS 110 of FIG. 1. The VAS 110 of FIG. 1 and the VES 120 of FIG. 1 could be combined into a single entity configured to render the MOP, build the MOP, and evaluate the MOP against requirements. An analyst operating an instance of the VAS 110 of FIG. 1 can perform cause and effect analysts by accessing various layers of MOPS to obtain the root cause of requirements violation. By varying requirements thresholds, the VAS 110 of FIG. 1 can allow the analyst to determine which requirements are sensible and which are not given overall top level operational requirements. Thus, the VAS 110 of FIG. 1 can aid the requirements decomposition process.

In one embodiment, factors can change and this can be a reason for the performance threshold to change. For example, a first ammunition rate can be desired. However, a resupply of ammunition can be delayed. This delay may cause the force to run out of ammunition. To avoid this situation, the desired rate of usage can be decreased (e.g., automatically, through explicit user instruction, etc.). The MOPs discussed in the last paragraph can be modified to compare actual usage against the new desired usage.

In one embodiment, the interface facilitates adjustment of the visualization according to scope (e.g., through use of the scope selection 240 of FIG. 2). In one embodiment, the visualization displays the performance metric against the performance threshold aligned in time. In one example, the MOP 220a displays actual ammunition usage over a period of time (e.g., g intervals over q number of hours) as well as displaying desired ammunition usage over time (e.g., less ammunition used at night while more is used during daylight hours). By accessing the distributed database 150 of FIG. 1 with MOPs (e.g., higher layer MOPs are being continuously built-up by the VES 120 of FIG. 1 and VAS 110 of FIG. 1), VAS 110 of FIG. 1 can render various layered MOPs against their requirements, with easy capability to navigate between (e.g., through visualization replacement) the layers of MOPs, thus facilitating a cause and effect analysis.

In one embodiment, the performance threshold comprises multiple levels. For example, the performance threshold can comprise a performance objective level (e.g., a desired level that causes an element of the visualization to be colored green), a performance threshold level (e.g., a minimally passing level that causes an element of the visualization to be colored yellow such that a threshold requirement is met but not an objective requirement), and a performance non-compliant level (e.g., an unacceptable level that causes an element of the visualization to be colored red).

In one embodiment, the visualization is displayed, at least in part, integrated with a spatial (e.g., physical distance) and temporal (e.g., time-based) system layout representation against multiple environments (e.g., terrain environment, weather environment, infrared environment, etc.). In one embodiment, the performance metric is a real-time metric (e.g., performance in real-time). The visualization can change as the performance metric changes to reflect a recent status of the performance metric against the performance threshold (e.g., if an individual tank's fire accuracy decreases over time, then a color of an element of the visualization can change from green to yellow if appropriate).

In one embodiment, the first visualization comprises a structured tree view (e.g., structured tree view 250 of FIG. 2) that illustrates the hierarchical relationship between the first level of the structured tree view and the second level of the structured tree view. The first visualization also illustrates elements (e.g., map with element 210 of FIG. 2) that are color-coded in accordance with verification of the performance threshold against the performance metric. The second visualization comprises the structured tree view that illustrates the hierarchical relationship between the first level and the second level. The second visualization also illustrates elements, different from at least one element of the first visualization (e.g., one less element, one more element, completely different elements, etc.), that are color-coded in accordance with verification of the performance threshold against the performance metric. The structured tree view can be a folder system that shows sub-folders and/or parent folders (e.g., where folders are color-coded based on a how a subject meets the performance threshold).

In one embodiment, the visualization comprises a structured tree portion (e.g., structured tree view 250) and an integrated selection portion, where the integrated selection portion comprises an experimentation selection portion that, when engaged, enables entry of an experimentation construct (e.g., a hypothetical scenario that can be run on how the force will achieve an objective); a subsystem selection portion that, when engaged, enables focus of the visualization on a selected subsystem of the system; and a parameter selection portion that, when engaged, enables selection of a parameter of at least part of the system (e.g., set maximum speed of a tank).

Figure 9:
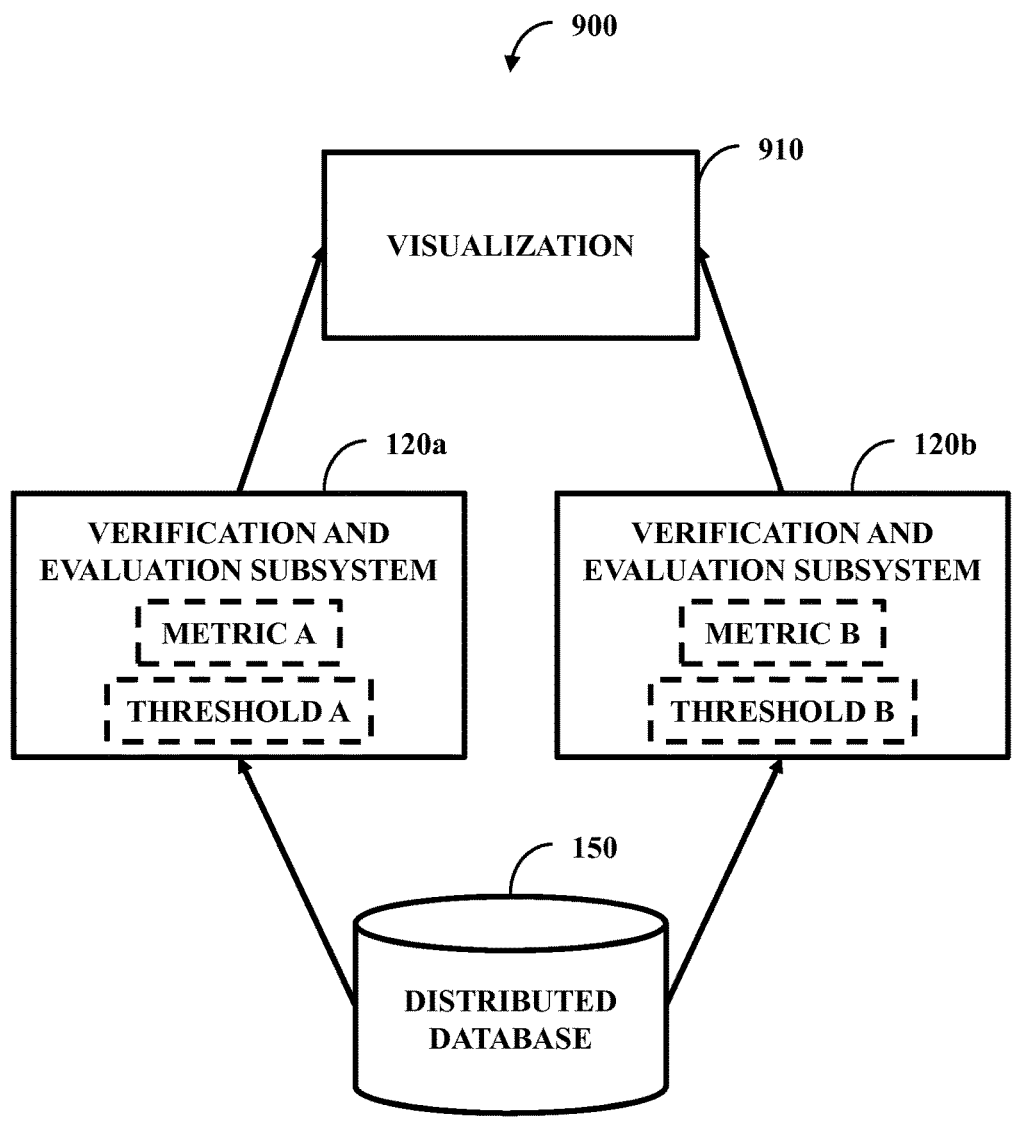
FIG. 9 illustrates one embodiment of a system comprising the distributed database, two verification and evaluation subsystems, and a visualization.

FIG. 9 illustrates one embodiment of a system 900 comprising the distributed database 150, two verification and evaluation subsystems (VESs) 120a and 120b, and a visualization 910 (e.g., the interface 200 of FIG. 2). The VESs 120a and 120b can operate in parallel (e.g., at the same time) and access data (e.g., data A for VES 120a and data B for VES 120b) from the distributed database 150. The VESs 120a and 120b can compare data against a metric. In one example, VES 120a compares metric A against threshold A while VES 120b compares metric B, that is different from metric A, against threshold B, that is different from threshold A. Results from this comparison can be used to create the visualization 910 (e.g., by a creation component configured to create the visualization from a result produced by at least one VES). In one example, VES 120a compares metric A against threshold A while VES 120b compares metric A against threshold B. In one example, VES 120a compares metric A against threshold A while VES 120b compares metric B against threshold A. It is to be appreciated by one of ordinary skill in the art that VES 120a and VES 120b can be part of the same system (e.g., a verification and evaluation system). In one embodiment, the system 900 comprises at least one VAS 110 of FIG. 1 to produce the visualization 910 (e.g., the VAS 110 and at least one VES, such as 120a and 120b, form one entity) and the VAS 110 of FIG. 1 can access the distributed database 150.

Figure 10:
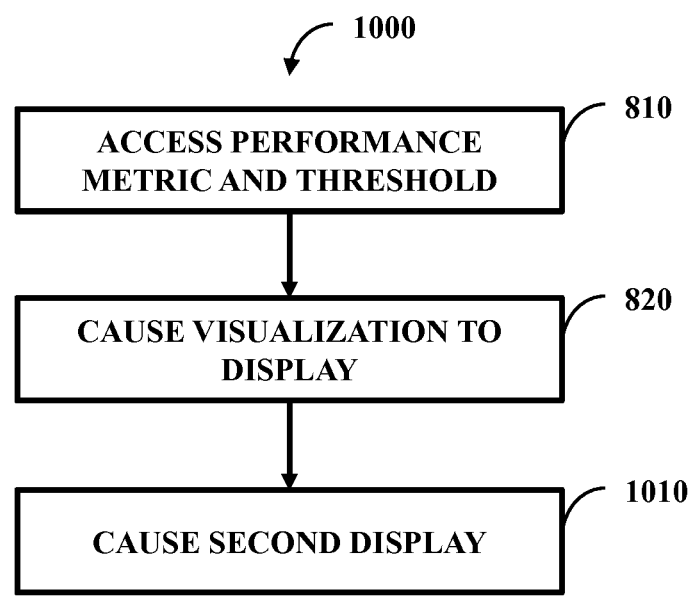
FIG. 10 illustrates one embodiment of a method comprising another action in addition to the actions.

FIG. 10 illustrates one embodiment of a method 1000 comprising another action 1010 in addition to the actions 810-820. At 1010 there is causing the visualization to display on a second interface at a second location (e.g., as identical to the visualization displayed on the first interface, different from the visualization displayed on the first interface, identical in format yet at least partially different in content from the visualization displayed on the first interface, etc.). The visualization is manipulatable (able to be manipulated) in a first manner at the first location while concurrently the visualization is manipulatable in a second manner (e.g., that is different from the first manner) at the second location (e.g., that is different from the first location). This manipulation can be controlled by an analyst (e.g., change in scope of the visuzalization).

In one embodiment, multiple editions of an initial visualization are populated upon a plurality of interfaces. Individual viewers of the interfaces can manipulate the visualization to their desire. Example manipulations can include changing MOPs displayed, changing map zoom level, changing scope, using playback functionality, etc. In one embodiment, different visualizations are initially created that are manipulatable.

In one embodiment, the performance threshold of the visualization displayed at the first interface is changed to a first changed performance threshold and the visualization displayed at the first interface is changed to reflect the first changed performance threshold. In one example, at the first interface the performance threshold is raised and in response a MOP of the visualization at the first interface is modified accordingly. The performance threshold of the visualization displayed at the second interface is changed to a second changed performance threshold and the visualization displayed at the second interface is changed to reflect the second changed performance threshold. In one example, at the second interface the performance threshold is lowered and in response a MOP of the visualization in the second interface is modified accordingly. Thus, the first changed performance threshold and the second changed performance threshold can be different. The visualization can be changed according to the first changed performance threshold and can be displayed on the first interface concurrently with display on the second interface of the visualization changed according to the second changed performance threshold.

In one embodiment, the performance metric is obtained, at least in part, through measurement of real-time performance of the system. In one embodiment, the performance metric is, at least in part, a performance experimentation record of the system and the performance metric is obtained from a computer-readable medium separable from the distributed database. In one embodiment, the performance metric is, at least in part, a result from a simulation of the system, where the simulation is run by a component separate from the system.

Figure 11:
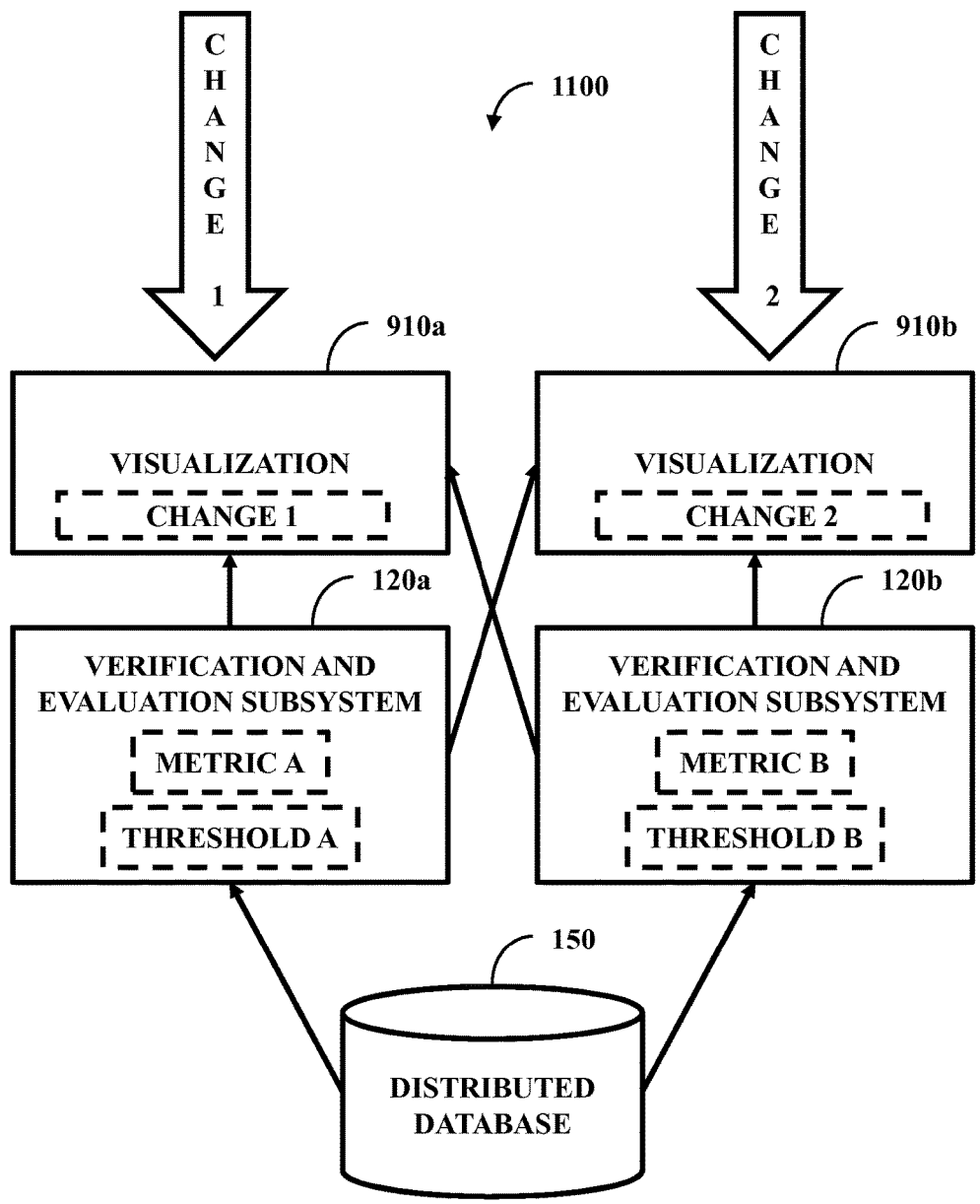
FIG. 11 illustrates one embodiment of a system comprising the distributed database, two verification and evaluation subsystems, and two visualizations.

FIG. 11 illustrates one embodiment of a system 1100 comprising the distributed database 150, two VESs 120a and 120b, and two visualizations 910a and 910b. The VESs 120a and 120b can access data from the distributed database 150, make comparisons with metrics (e.g., where the metrics are accessed from and/or retained in the distributed database 150), and produce a result. The result can be used to create the visualizations 910a and 910b. The visualizations 910a and 910b can be subjected to two different changes—change 1 for visualization 910a and change 2 for visualization 910b.

The visualization 910a can be subjected to change 1 while concurrently visualization 910b can be subjected to change 2. Change 1 and change 2 (e.g., changes to metrics A and B from the distributed database 150, changes to the thresholds A and B from at least one user) can be identical changes (e.g., changing the same element the same way), divergent changes (e.g., changing the same element different ways on different visualizations), convergent changes (e.g., changing different elements in the same way), unrelated changes, etc. In one embodiment, the system 1100 comprises at least one VAS 110 of FIG. 1.

Figure 12:
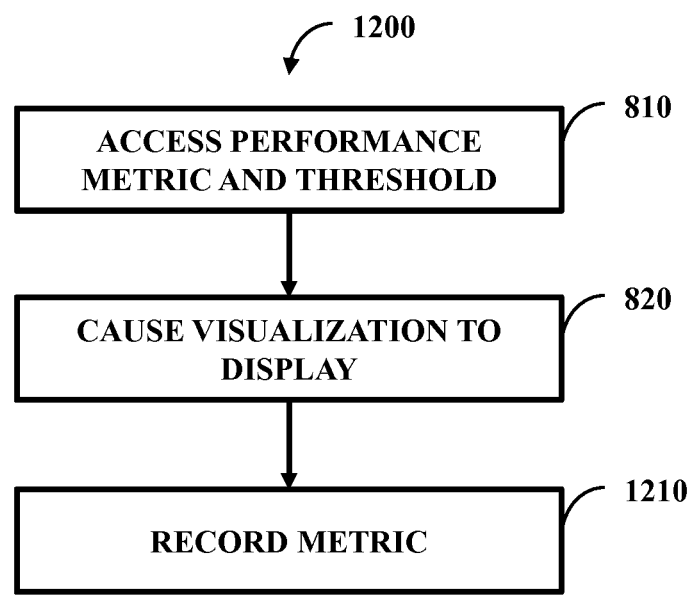
FIG. 12 illustrates one embodiment of a method comprising an additional action in addition to the actions.

FIG. 12 illustrates one embodiment of a method 1200 comprising an additional action 1210 in addition to the actions 810-820. At 1210 there is recording the performance metric, where the visualization displays the performance metric against the performance threshold aligned in time and where the interface is configured cause the visualization to display a playback illustration of the performance metric against the performance threshold. The interface can include playback functionality (e.g., accessible through use of the time controls 230 of FIG. 2) that is similar to Digital Video Recorder functionality (e.g., pause, rewind, fast forward, etc.). In one embodiment, as data is rendered by the VAS 110 of FIG. 1 and a MOP is created by the VAS 110 of FIG. 1, the VAS 110 of FIG. 1 retains the MOP in the distributed database 150 of FIG. 1 and the MOP can be recalled through the playback functionality. The VAS 110 of FIG. 1 can control what is being rendered and when rendering occurs (e.g., in response to user instruction).

As the instrumented data 130 of FIG. 1 is gathered, the instrumented data 130 of FIG. 1 can be retained (e.g., in the distributed database 150 of FIG. 1). The VES 120 of FIG. 1 can process the instrumented data 130 of FIG. 1 and based on a result of this processing, the VAS 110 of FIG. 1 can cause the visualization to be presented on the interface. The processing of the instrumented data 130 of FIG. 1 (e.g., comparison of the instrumented data 130 of FIG. 1 against a performance metric) can be continuous and/or at set time intervals. The result from this processing can be recorded (e.g., in the distributed database 150 of FIG. 1, locally to an apparatus that displays the interface, etc.). The VAS 110 of FIG. 1 can create and manage the interface. In one example, a user can request to rewind the interface such that the user can view changes in time to MOPs 220a-220c of FIG. 2, the map with element 210 of FIG. 2, etc. The request can be to modify the visualization in part (e.g., the map with element 210 of FIG. 2) while not modifying another part (e.g., MOPs 220a-220c of FIG. 2). The VAS 110 of FIG. 1 can facilitate the rewind by accessing the recorded result and using the recorded result to modify the interface and/or visualization (e.g., show the map with elements 210 of FIG. 2 with element location and a visual indicator of how a performance metric meets a performance threshold in at least one previous point in time).

Figure 13:
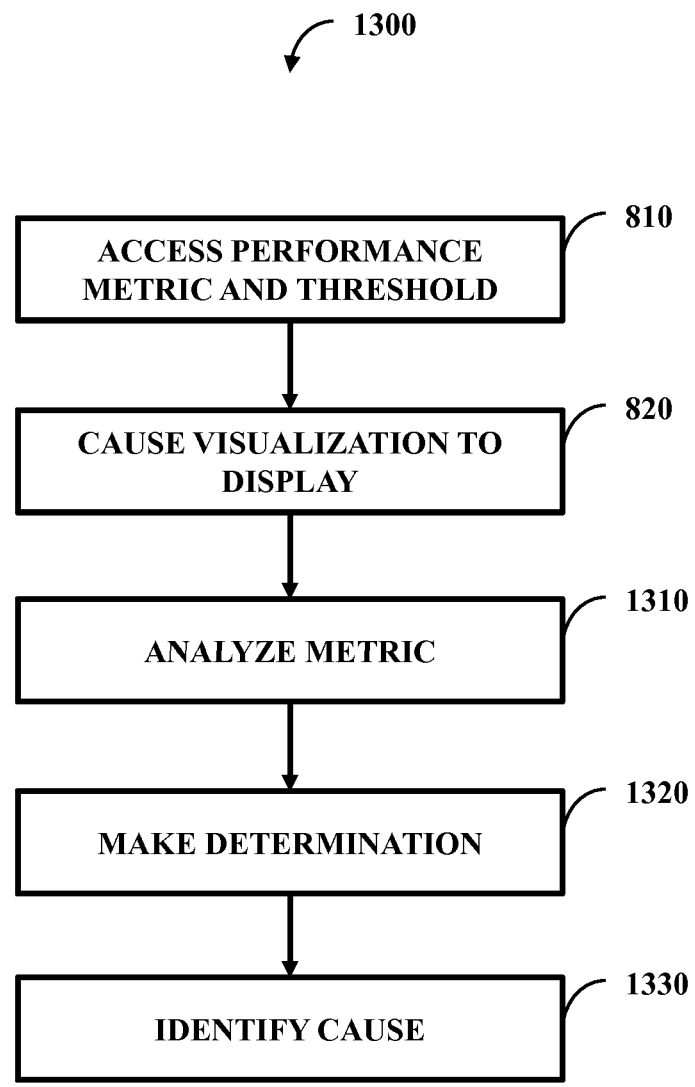
FIG. 13 illustrates one embodiment of a method comprising other actions in addition to the actions.

FIG. 13 illustrates one embodiment of a method 1300 comprising other actions 1310-1330 in addition to the actions 810-820. At 1310 there is analyzing the performance metric against the performance threshold to produce an analysis result. At 1320 there is making a determination on if the performance metric is performing at an acceptable level, where the determination is based, at least in part, on the analysis result. At 1330 there is identifying (e.g., proactively identifying) a cause of the performance metric not performing at the acceptable level in response to the determination being that the performance metric is not performing at the acceptable level, where a representation of the cause is displayed on the interface (e.g., the method 1300 can comprise causing the representation to display on the interface as part of the visualization).

In one embodiment, returning to the previous example, actual fuel consumption of an individual tank (the performance metric) can be compared against a desired consumption of fuel for the individual tank (the performance threshold). The result of this comparison (e.g., functioning as the analysis) can be that the fuel consumption is greater than desired and thus considered failing (e.g., the designation of failing can function as the determination). This failure can be presented on the visualization as showing a name of the tank on a map in red. An identification can occur (e.g., proactively, in response to a user request, when the failure meets an additional threshold, etc.) that identifies why the failure occurs and a reason for the failure can be displayed. In one example, a diagnostic check can be performed on a fuel system of the individual tank and a determination can be made that a specific situation (e.g., fuel-line leak, a corrupted computer fuel management system, incorrect throttle use by a soldier, etc.) causes the failure. This failure can be logged (e.g., in the distributed database 150 of FIG. 1) and/or be presented (e.g., on the interface).

Figure 14:
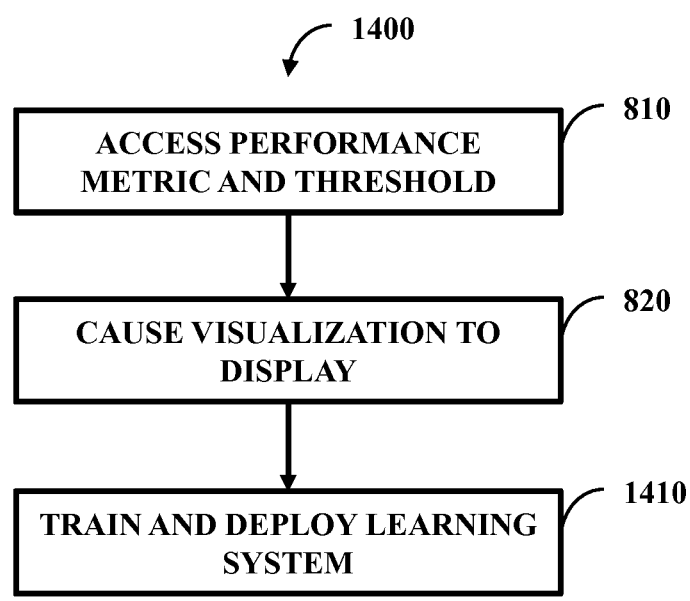
FIG. 14 illustrates one embodiment of a method comprising a further action 1210 in addition to the actions.

FIG. 14 illustrates one embodiment of a method 1400 comprising a further action 1410 in addition to the actions 810-820. At 810, there is accessing a performance metric of a system with a distributed database as well as accessing a performance threshold for the performance metric. At 820, there is causing a first visualization to display on an interface, where the first visualization illustrates the performance metric against the performance threshold and where the performance threshold is adjustable by way of the interface while the visualization is displayed. At 820, there is also causing the first visualization to be replaced with a second visualization, where the first visualization is of a first level of the system, where the second visualization is of a second level of the system, where the first level and the second level are time-synchronized with one another, and where the first level and the second level share a hierarchical relationship. At 1410, there is training an adaptive learning system through use a correlation of technical performance data of the system against operational performance data of the system, where the adaptive learning system is configured to predict operational performance from a technical perspective and from a tiered data and metric perspective. At 1410, there is also causing the adaptive learning system to be deployed after the adaptive learning system is trained, where the adaptive learning system is configured to determine a mission effectiveness of the system once deployed.

What is claimed is:

1. A non-transitory computer-readable medium configured to store an instruction set that when executed by a processor cause the processor to perform a method, the method comprising:
    obtaining a performance metric for an aspect of a complex system at a first point in time;
    obtaining a performance metric for the aspect of the complex system at a second point in time;
    obtaining a performance threshold for the performance metric;
    comparing the performance metric for the aspect of the complex system at the first point in time against the performance threshold to produce a first comparison result;
    comparing the performance metric for the aspect of the complex system at the second point in time against the performance threshold to produce a second comparison result;
    calculating a first physical distance between the mobile unit and the location of interest at the third point of time;
    calculating a second physical distance between the mobile unit and the location of interest at the fourth point of time; and
    causing a user interface to be rendered,
    where the user interface comprises a visualization,
    where the visualization is rendered such that the visualization is integrated with a spatial complex system layout representation and temporal complex system layout representation,
    where the spatial complex system layout representation is configured to illustrate the first physical distance and the second physical distance, and
    where the temporal complex system layout representation is capable of illustration of the first comparison result and the second comparison result.

2. A system for presentation of a visualization upon a computer screen, comprising:
    a computer store access apparatus that obtains a data set from a computer store,
    where the data set comprises a performance metric for an aspect of a complex system at a first point in time, where the data set comprises a performance metric for the aspect of the complex system at a second point in time, where the data set comprises a performance threshold for the performance metric, where the data set comprises physical location information for a mobile unit of the complex system and physical location information for a location of interest at a third point in time, where the data set comprises physical location information for the mobile unit of the complex system and the physical location information for the location a interest at a fourth point in time, and where the location of interest is a physical location of a unit separate from the mobile unit;
    a comparator that compares the performance metric for the aspect of the complex system at the first point in time against the performance threshold to produce a first comparison result and compares the performance metric for the aspect of the complex system at the second point in time against the performance threshold to produce a second comparison result;
    a calculator that calculates a first physical distance between the mobile unit and the location of interest at the third point of time and calculates a second physical distance between the mobile unit and the location of interest at the fourth point of time;
    a visualization renderer that renders a visualization,
        where the visualization is integrated with a spatial complex system layout representation and temporal complex system layout representation
        where the spatial complex system layout representation is capable of illustration of the first physical distance and the second physical distance, and
        where the temporal complex system layout representation is capable of illustration of the first comparison result and the second comparison result.

3. The non-transitory computer-readable medium of claim 1,
    where obtaining the performance metric for the aspect of the complex system at the first point in time comprises employing a verification and evaluation subsystem to build the performance metric.

4. The non-transitory computer-readable medium of claim 1, where causing the user interface to be rendered is performed, at least in part, by a visualization and analysis subsystem.

5. The non-transitory computer-readable medium of claim 1,
where the user interface discloses at least one measure of performance.

6. The non-transitory computer-readable medium of claim 1,
where the user interface discloses a hierarchical menu for a military force.

7. The non-transitory computer-readable medium of claim 1,
where the performance metric for the aspect of the complex system is a multi-level metric.

8. The non-transitory computer-readable medium of claim 1, the method comprising:
causing an adaptive learning system to be trained through employment of the performance metric for the aspect of the complex system at the first point in time and through employment of the performance metric for the aspect of the complex system at the second point in time.

9. The system of claim 2,
where the computer store is a distributed database.

10. The system of claim 2,
where the spatial complex system layout representation is capable of illustration of the first physical distance and the second physical distance in a first environment concurrently with illustration of the first physical distance and the second physical distance in a second environment different from the first environment.

11. The system of claim 2,
where the performance metric is a real-time metric and
where the visualization changes as the performance metric changes to reflect a recent status of the performance metric against the performance threshold.

12. The system of claim 2,
where the performance metric is derived, at least in part, from a simulation of the system.

13. The system of claim 2,
where the performance metric is, at least in part, a performance experimentation record of the system.

14. The system of claim 2
where the performance metric is derived, at least in part, through measurement of real-time performance of the system.

15. The system of claim 2,
where the first point in time and the third point in time are the same point in time,
where the second point in time and the fourth point in time are the same point in time, and
where the first point in time and the second point in time are not the same point in time.

16. A processor configured to execute an instruction set such that a component set is effectuated, the component set comprising:
an obtainment component configured to obtain, from a non-transitory computer-readable medium, a performance metric of an aspect of a complex system at a first point in time, a performance metric for the aspect of the complex system at a second point in time, a performance threshold for the performance metric, physical location information for a mobile unit of the complex system and physical location information for a location of interest at a third point in time, physical location information for the mobile unit of the complex system and the physical location information for the location of interest at a fourth point in time, and the location of interest is a physical location of a unit separate from the mobile unit;
a comparison component configured to compare the performance metric for the aspect of the complex system at the first point in time against the performance threshold to produce a first comparison result and configured to compare the performance metric for the aspect of the complex system at the second point in time against the performance threshold to produce a second comparison result;
a calculation component configured to calculate a first physical distance between the mobile unit and the location of interest at the third point of time and configured to calculate a second physical distance between the mobile unit and the location of interest at the fourth point of time; and
a user interface component configured to cause a user interface to be rendered with a visualization such that the visualization is integrated with a spatial complex system layout representation capable of illustration of the first comparison result and the second comparison result and integrated with a temporal complex system layout representation capable of illustration of the first physical distance and the second physical distance.

17. The processor of claim 16,
where the comparison component is implemented, at least in part, by way of a verification and evaluation subsystem.

18. The processor of claim 16,
where the non-transitory computer-readable medium is a distributed database.

19. The method processor of claim 16,
where a value of the performance is adjustable by way of the user interface.

20. The processor of claim 16,
where
spatial complex system layout representation is capable of being rendered with a first environment,
where spatial complex system layout representation is capable of being rendered with a second environment,
where temporal complex system layout representation is capable of being rendered with, the first environment, and
where temporal complex system layout representation is capable of being rendered with the second environment.

* * * * *